United States Patent
Azuma et al.

(10) Patent No.: US 9,978,497 B2
(45) Date of Patent: May 22, 2018

(54) WOUND MAGNETIC CORE AND METHOD OF PRODUCING THE SAME

(71) Applicant: HITACHI METALS, LTD., Minato-ku, Tokyo (JP)

(72) Inventors: Daichi Azuma, Yasugi (JP); Naoki Itoh, Yasugi (JP); Makoto Sasaki, Kumagaya (JP); Shinichi Kazui, Kumagaya (JP)

(73) Assignee: HITACHI METALS, LTD., Tokyo (JP)

( * ) Notice: Subject to any disclaimer, the term of this patent is extended or adjusted under 35 U.S.C. 154(b) by 175 days.

(21) Appl. No.: 14/774,703

(22) PCT Filed: Mar. 12, 2014

(86) PCT No.: PCT/JP2014/056575
§ 371 (c)(1),
(2) Date: Sep. 11, 2015

(87) PCT Pub. No.: WO2014/142204
PCT Pub. Date: Sep. 18, 2014

(65) Prior Publication Data
US 2016/0035474 A1 Feb. 4, 2016

(30) Foreign Application Priority Data
Mar. 13, 2013 (JP) .................. 2013-051035

(51) Int. Cl.
*H01F 27/24* (2006.01)
*H01F 3/04* (2006.01)
(Continued)

(52) U.S. Cl.
CPC ........ *H01F 27/24* (2013.01); *B23K 26/0006* (2013.01); *B23K 26/0081* (2013.01);
(Continued)

(58) Field of Classification Search
None
See application file for complete search history.

(56) References Cited

U.S. PATENT DOCUMENTS 4,685,980 A * 8/1987 Sato .................... C21D 1/09
148/304
5,338,373 A * 8/1994 Vonhoene ............ G01V 15/00
148/121
(Continued)

FOREIGN PATENT DOCUMENTS

JP   H04-367202 A   12/1992
WO  2011/030907 A1   3/2011
WO  2012/102379 A1   8/2012

OTHER PUBLICATIONS

WIPO Search Report (dated Oct. 6, 2014).*

*Primary Examiner* — Kevin M Bernatz
(74) *Attorney, Agent, or Firm* — Solaris Intellectual Property Group, PLLC

(57) ABSTRACT

The invention provides a wound magnetic core which is configured by winding an Fe-based amorphous alloy ribbon, the wound magnetic core containing a recess row including plural recesses formed by laser irradiation in a central part of the Fe-based amorphous alloy ribbon in a width direction, in which a ratio of a length of the central part to a total width is from 0.2 to 0.8.

5 Claims, 8 Drawing Sheets

(51) Int. Cl.
   *B23K 26/40*      (2014.01)
   *H01F 1/153*      (2006.01)
   *H01F 41/02*      (2006.01)
   *B23K 26/00*      (2014.01)
   *B23K 26/08*      (2014.01)
   *B23K 26/354*     (2014.01)
   *B23K 26/082*     (2014.01)
   *B23K 26/0622*    (2014.01)
   *B23K 26/361*     (2014.01)
   *B23K 103/02*     (2006.01)
   *B23K 101/36*     (2006.01)

(52) U.S. Cl.
   CPC ...... *B23K 26/0084* (2013.01); *B23K 26/0622* (2015.10); *B23K 26/082* (2015.10); *B23K 26/0853* (2013.01); *B23K 26/354* (2015.10); *B23K 26/361* (2015.10); *B23K 26/40* (2013.01); *H01F 1/153* (2013.01); *H01F 3/04* (2013.01); *H01F 41/0206* (2013.01); *B23K 2201/36* (2013.01); *B23K 2203/02* (2013.01); *H01F 1/15308* (2013.01); *H01F 41/0226* (2013.01)

(56)          References Cited

U.S. PATENT DOCUMENTS

| 9,290,831    | B2 * | 3/2016 | Yoshizawa | C22C 38/02 |
| 2009/0145526 | A1 * | 6/2009 | Arai      | H01F 1/16  |
|              |      |        |           | 148/512    |
| 2012/0154084 | A1 * | 6/2012 | Yoshizawa | C22C 38/02 |
|              |      |        |           | 335/297    |
| 2016/0035474 | A1 * | 2/2016 | Azuma     | B23K 26/361 |
|              |      |        |           | 336/213    |

\* cited by examiner

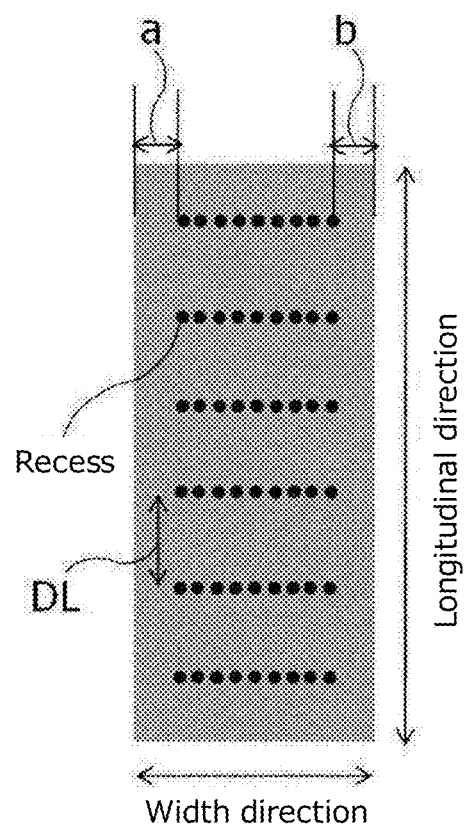
Fig. 1-A

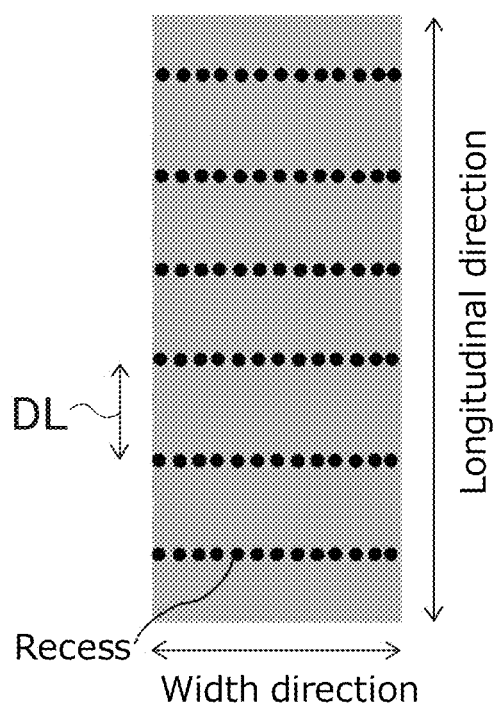
Fig.1-B

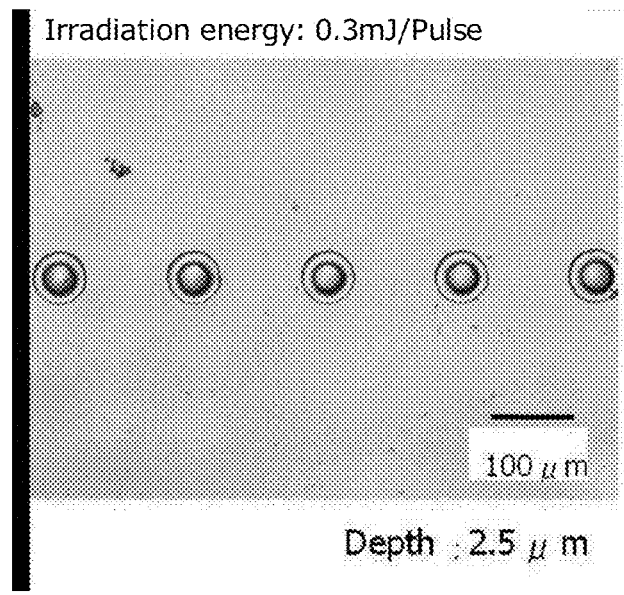
Fig. 5-A
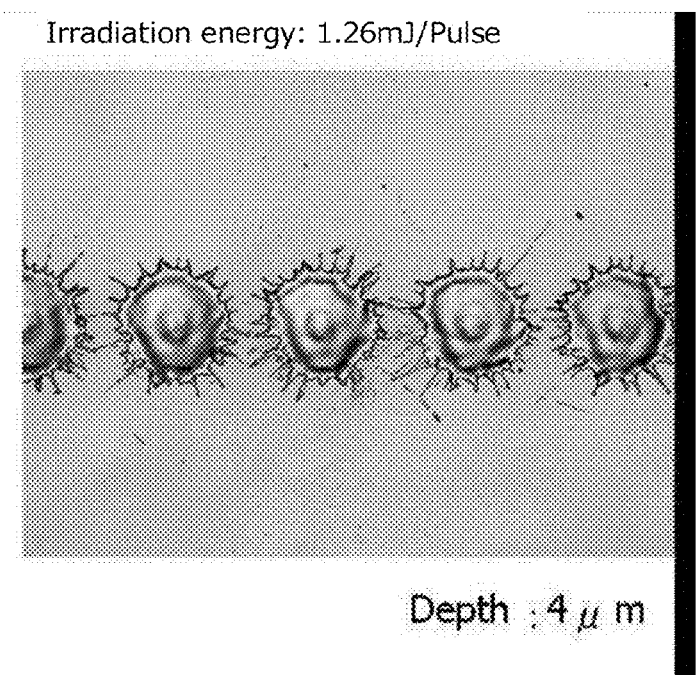
Fig. 5-B

WOUND MAGNETIC CORE AND METHOD OF PRODUCING THE SAME

TECHNICAL FIELD

The present invention relates to a wound magnetic core formed by winding an Fe-based amorphous alloy ribbon and used mainly as a magnetic core material for a power distribution transformer, a high-frequency transformer, a saturable reactor, a magnetic switch, etc., and a method of producing the magnetic core.

BACKGROUND ART

An amorphous alloy is produced as a ribbon-shaped alloy by a liquid quenching method such as a single roller method. Since there is no crystal grain in an amorphous alloy containing Fe or Co, there exists no crystal magnetic anisotropy, and it has been known that the amorphous alloy exhibits excellent soft magnetism with small magnetic hysteresis, a low coersive force, and a low hysteresis loss. Consequently, an amorphous alloy ribbon containing Fe or Co has been put into practical use in various applications such as a power distribution transformer, a laser power source, and an accelerator, as a soft magnetic material for a magnetic core of various transformers, a chalk coil, various sensors, a saturable reactor, a magnetic switch, etc. Especially, the Fe-based amorphous soft magnetic alloy ribbon has drawn attention as an energy saving material because of its relatively high saturation magnetic flux density Bs, low coersive force, and low iron loss. Among various types of Fe-based amorphous alloy ribbons, an Fe—Si—B amorphous soft magnetic alloy ribbon, which is especially superior in thermal stability, has been broadly used as a transformer magnetic core material.

Since an amorphous soft magnetic alloy represented by an Fe—Si—B amorphous alloy has small magnetic hysteresis and a low coersive force, the hysteresis loss is small. However, it has been known that a broadly-defined eddy-current loss calculated as a difference of an iron loss value minus a hysteresis loss is several tens times to 100 times as high as a classical eddy-current loss obtained by assuming uniform magnetization. This increment is called as anomalous eddy-current loss or excess loss, which is conceivably caused mainly by non-uniform change of magnetization attributable to large width of a magnetic domain of an amorphous alloy.

As a method for reducing the anomalous eddy-current loss of an amorphous alloy ribbon to reduce an iron loss, a scratching method, by which an amorphous alloy ribbon surface is scribed mechanically, a laser scribing method, by which an amorphous alloy ribbon surface is irradiated with laser light for refining a magnetic domain through local melting followed by quenching to solidify, and the like have been known.

Patent Document 1 discloses an amorphous soft magnetic alloy ribbon having undergone a magnetic domain refinement treatment, by which an amorphous soft magnetic alloy ribbon surface is irradiated with pulsed laser light to form amorphous recesses in a linear or dot-line form on the amorphous alloy ribbon surface at predetermined intervals in a longitudinal direction, and describes that the height of a protrusion formed on the amorphous magnetic alloy ribbon around the recess is limited to 2 μm or less. By this means, a low iron loss and a low apparent power can be achieved.

CITATION LIST

Patent Document

[Patent Document 1] International Publication No. WO 2011/030907

DISCLOSURE OF THE INVENTION

Problem to be Solved by the Invention

In an amorphous alloy ribbon received laser scribing described in Patent Document 1, an iron loss and an apparent power (exciting VA) are reduced, and improvement of a space factor can be expected. However, with respect to laser scribing on an amorphous alloy ribbon, although the shape or interval of recesses have been investigated, the influence of the position for forming recesses has not been investigated sufficiently.

The invention was made under such circumstances. Under such a situation, objects of the invention are to provide a wound magnetic core, which is constituted especially by winding the Fe-based amorphous alloy and has a low iron loss, and to provide a method of producing the wound magnetic core.

Means for Solving the Problems

Specific means for achieving the objects are as follows.
<1> A wound magnetic core which is configured by winding an Fe-based amorphous alloy ribbon, the wound magnetic core containing a recess row including a plurality of recesses formed by laser irradiation in a central part of the Fe-based amorphous alloy ribbon in a width direction, wherein a ratio of a length of the central part to a total width is from 0.2 to 0.8.

An Fe-based amorphous alloy means an amorphous alloy containing Fe as a main component. "Main component" means a highest content component.
<2> The wound magnetic core as described in <1> above, wherein an interval between the recess rows in a longitudinal direction of the alloy ribbon is from 2 mm to 20 mm.
<3> The wound magnetic core as described in <1> or <2> above, wherein a thickness of the Fe-based amorphous alloy ribbon is from 15 μm to 40 μm.
<4> The wound magnetic core as described in any one of the above <1> to <3> above, wherein a total width of the Fe-based amorphous alloy ribbon is from 15 mm to 250 mm.
<5> The wound magnetic core as described in any one of the above <1> to <4> above, wherein center-to-center distances between adjacent recesses in the recess rows are equal, and a formation interval of the recesses is in a range of from 4 pieces/mm to 8 pieces/mm in the width direction.
<6> The wound magnetic core as described in <5> above, wherein a planar view shape of the recesses is a circular or elliptical shape.
<7> A method of producing a wound magnetic core, the method including; forming recesses by irradiating a central part of the Fe-based amorphous alloy ribbon in a width direction is irradiated with pulsed laser light to form recesses, wherein a ratio of a length of the central part to a total width is from 0.2 to 0.8, and winding the Fe-based amorphous alloy ribbon with the formed recesses to form a magnetic core.

<8> The method of producing a wound magnetic core as described in <7> above, wherein in the forming of the recesses the alloy ribbon is irradiated with pulsed laser light at intervals of from 2 mm to 20 mm in a longitudinal direction of the alloy ribbon to form the recesses.

<9> The method of producing a wound magnetic core as described in <7> or <8> above, wherein a thickness of the Fe-based amorphous alloy ribbon is from 15 μm to 40 μm.

Effects of the Invention

According to the invention, a wound magnetic core configured by winding especially an Fe-based amorphous alloy, exhibiting a low iron loss, and a method of producing the wound magnetic core are provided.

Since a magnetic core configured by winding the Fe-based amorphous alloy and having an effective characteristic that a wound magnetic core has a low iron loss can be obtained with high productivity, the industrial value is high.

BRIEF DESCRIPTION OF DRAWINGS

FIG. 1-A is a schematic diagram showing a embodiment of the invention, in which recesses are formed at intervals DL in a central part of the Fe-based amorphous alloy ribbon excluding margins in lengths a and b from both ends in a width direction.

FIG. 1-B is a schematic diagram showing a conventional embodiment, in which recesses are formed entirely in a width direction of the Fe-based amorphous alloy ribbon.

FIG. 5-A is a microphotograph showing a recess and its surrounding configuration when a laser irradiation energy of 0.3 mJ/pulse is applied.

FIG. 5-B is a microphotograph showing a recess and its surrounding configuration when a laser irradiation energy of 1.26 mJ/pulse is applied.

DESCRIPTION OF EMBODIMENTS

Figure 2:
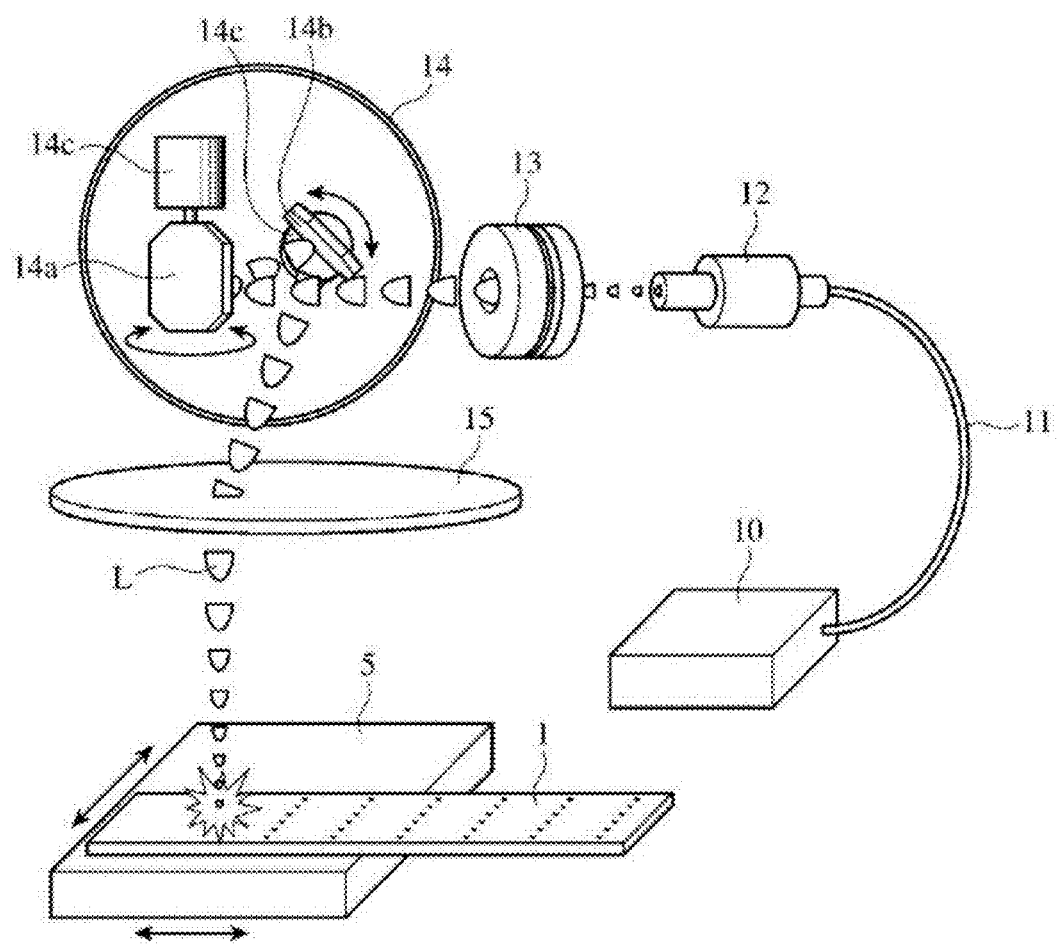
FIG. 2 is a schematic diagram showing an example of a laser light irradiation device usable in production of a wound magnetic core according to the invention.

A wound magnetic core and a method of producing the wound magnetic core according to the invention will be described below in detail.

The invention is a wound magnetic core which is configured by winding an Fe-based amorphous alloy ribbon, the wound magnetic core containing a recess row including a plurality of recesses formed by laser irradiation in a central part of the Fe-based amorphous alloy ribbon in a width direction.

It has been found owing to the invention that even when not the total width is irradiated with laser light, but a central part excluding side margins in a width direction is irradiated with laser light, a wound magnetic core constituted therewith exhibits an equal or better effect of reduction of an iron loss compared to a case in which the total width is irradiated with laser light. Specifically, by putting the total width of the Fe-based amorphous alloy ribbon as 1, the central part in a width direction in a relative length of from 0.2 to 0.8 is irradiated with laser light according to the invention. By this, the frequency of laser processings decreases and reduction of man-hour becomes possible, and the laser processing speed per unit length of the casting direction (longitudinal direction) of the Fe-based amorphous alloy ribbon can be increased to improve effectively the productivity. Further, a thus obtained wound magnetic core exhibits a low iron loss.

Although there is no particular restriction on a method of producing a wound magnetic core according to the invention, insofar as the above constitution is realized, a wound magnetic core is preferably produced by a method (a method of producing a wound magnetic core according to the invention) constituted by providing a recess forming process, in which a central part of the Fe-based amorphous alloy ribbon in a width direction, wherein a ratio of a length of the central part to a total width is from 0.2 to 0.8, is irradiated with pulsed laser light to form a recess (preferably a recess row composed of a plurality of recesses), and a winding process, in which the Fe-based amorphous alloy ribbon with the formed recesses is wound to a magnetic core. Each process will be described below.

<Recess Forming Process (Laser Processing)>

In the recess forming process according to the invention, a central part in a predetermined range of the Fe-based amorphous alloy ribbon in a width direction is irradiated with pulsed laser light to form recesses. In this process, when a recess is formed by irradiation with a pulsed laser light, a recess row composed of a plurality of recesses can be provided.

In this case, the ratio of a central part in a predetermined range to the total width of the Fe-based amorphous alloy ribbon is from 0.2 to 0.8 (namely, a length equal to 20% to 80% of the total width of the Fe-based amorphous alloy ribbon).

According to the invention, recesses are formed preferably by irradiating only the central part in a predetermined range with pulsed laser light.

A magnetic core produced through a laser processing of a region occupying from 0.2 to 0.8 with respect to a total width as 1 of a central part of the total width of the Fe-based amorphous alloy ribbon, can achieve a low iron loss equal to or better than the case where the total width of the Fe-based amorphous alloy ribbon is processed by laser light, while attaining man-hour reduction. Although the reason why such a low iron loss can be achieved is not very clear, many factors such as a behavior of a magnetic domain in a magnetic core are presumably involved complicatedly.

The invention teaches that by performing a laser processing selectively on a central region excluding side margins of an alloy ribbon in a width direction and constituting therewith a wound magnetic core, a wound magnetic core exhibiting a low iron loss can be obtained. A ratio from 0.2 to 0.8 with respect to the total width represents the range of a "central part" allowing man-hour reduction. In other words, when a ratio of a length of a central part with respect to a total width as 1 is in a range exceeding 0.8, an advantage of reduction of man-hour for a laser processing while assuring an effect of lowering an iron loss according to the invention over a conventional method, by which the total width is processed with laser light, is impaired. Further, when a ratio of a length of a central part with respect to a total width as 1 is in a range less than 0.2, the laser processing amount becomes excessively short compared to a conventionally performed laser processing, and the effect (reduction of iron loss of a magnetic core) of a laser processing decreases.

Among others, the ratio of a central part in a predetermined range to the total width of the Fe-based amorphous alloy ribbon is preferably in a range of from 0.4 to 0.8, and more preferably in a range of from 0.4 to 0.6 from a viewpoint of iron loss reduction.

Further, from a viewpoint of iron loss reduction as described below, an interval of laser irradiation in a longitudinal direction of an alloy ribbon, namely an interval (DL) between recess rows arranged in a longitudinal direction of an alloy ribbon is preferably from 2 mm to 20 mm. In this case, further reduction of an iron loss becomes possible.

When the irradiation energy of laser light is regulated in connection with a thickness of the Fe-based amorphous alloy ribbon, the diameter of a recess or the depth of a recess can be regulated.

In a laser processing for forming recesses, pulsed laser light is scanned and irradiated in a width direction of a ribbon.

As a laser light source, a YAG laser, a $CO_2$ gas laser, a fiber laser, etc. can be applied. Among them, a fiber laser is preferable, because high power and high-frequency pulsed laser light can be stably irradiated for a long time. In a fiber laser, laser light introduced into a fiber is oscillated by diffraction lattices at both ends of the fiber according to the principle of FBG (Fiber Bragg grating). Since laser light is excited in a slender fiber, there occurs no drawback of a thermal lens effect by which a beam quality is deteriorated by temperature gradient generated inside a crystal. Further, since a fiber core is as thin as several micrometers, not only even high power laser light transmits in a single mode, but also the beam diameter is reduced to yield high energy density laser light. Moreover, since the focal depth is large, a recess row can be formed with high accuracy on a ribbon as wide as 200 mm or more. Although the pulse width of a fiber laser is ordinarily in an approximate range of from microsecond to picosecond, the width at a femtosecond-level may be also used.

The wavelength of laser light depends on a laser light source, and is from approximately 250 nm to 1,100 nm. However, the wavelength of from 900 to 1,100 nm is appropriate, because such light is thoroughly absorbed in an alloy ribbon.

The beam diameter of laser light is preferably 10 μm or more, more preferably 20 μm or more, and most preferably 30 μm or more. Further, the beam diameter is preferably 300 μm or less, more preferably 100 μm or less, and most preferably 90 μm or less.

Next, an example of a laser light irradiation device usable in a recess forming process according to the invention will be specifically described referring to FIG. 2.

The device is provided with a laser oscillator (fiber laser) 10, a collimator 12, a beam expander 13, a galvano scanner 14, and an fθ lens 15. Pulsed laser light L generated by a laser oscillator (for example, wavelength 1,065 nm) is transmitted through a fiber 11 to a collimator 12 to be formed to parallel light. The parallel laser light L is enlarged in terms of diameter by a beam expander 13, passes a galvano scanner 14, collected by an fθ lens 15, and irradiated on an amorphous alloy ribbon 1 mounted on a table 5 movable in an X axis direction and a Y axis direction. The galvano scanner 14 is provided with mirrors 14a and 14b, which are rotatable around the X axis or the Y axis, wherein the respective mirrors 14a and 14b are driven by galvano motors 14c. By a combination of the mirrors 14a and 14b, the pulsed laser light L can be scanned on the alloy ribbon in a width direction at predetermined intervals in a longitudinal direction. Instead of the galvano scanner 14, a polygon scanner (not illustrated) provided with a polygon mirror at a motor edge may be used. In a case in which recess rows are formed continuously on the Fe-based amorphous alloy ribbon 1 in a width direction at predetermined intervals in a longitudinal direction, the Fe-based amorphous alloy ribbon is moved in a longitudinal direction, and therefore the scanning direction of the laser light L is preferably inclined at a predetermined angle to the width direction.

Irradiation with laser light is preferably carried out by moving the Fe-based amorphous alloy ribbon intermittently in a longitudinal direction. In a case in which the Fe-based amorphous alloy ribbon is produced, for example, by a liquid quenching method, the irradiation may be conducted also before the Fe-based amorphous alloy ribbon is spooled on to a reel.

By performing a laser processing, the Fe-based amorphous partly melts or evaporates and a molten part remaining after the laser processing solidifies again to introduce a local strain. When a local strain is introduced, the soft magnetic characteristic of the Fe-based amorphous sensitive to a strain deteriorates to increase the hysteresis loss, and as the result the iron loss is increased. The invention, according to which only the central part in a width direction is selectively processed with laser for forming a recess, has conceivably a function to suppress increase in hysteresis loss caused by introduction of a local strain.

The Fe-based amorphous alloy ribbon constituting a wound magnetic core according to the invention is, for example as shown in FIG. 1-A, is provided with a plurality of circular recesses made by a laser processing forming a row of dots at equal intervals in a width direction of the Fe-based amorphous alloy ribbon except vacant margins in the predetermined lengths of a and b from both ends in a width direction (for example, in FIG. 1-A, a=b=5 mm). In this regard, the rows of dots are provided at predetermined intervals (DL) in a longitudinal direction of the ribbon. With respect to the structure, in which the margins in the predetermined length from the ends in a width direction of the ribbon are left free from recesses, the time required for processing an Fe-based amorphous alloy ribbon with a laser can be shortened, which contributes remarkably to improvement of the productivity of a laser processing, compare to a conventional structure, in which recesses are provided as in FIG. 1-B entirely from an end to the other end in a width direction, namely compared to a case in which a laser processing is performed over the total width.

In this regard, the interval of the recesses formed on the ribbon by laser irradiation is preferably equivalent to from 4 pieces/mm to 8 pieces/mm of recesses in a width direction. When the formation interval of the recesses is within the range, the reduction effect of iron loss is large. When the number of recesses is not too small and 4 pieces/mm or more, it is conceived that a magnetic domain is refined by formation of recesses. Meanwhile, when the number of recesses is not too large and 8 pieces/mm or less, the productivity can be maintained high, and a local strain to be introduced under an influence of a laser processing can be suppressed to maintain the hysteresis loss low.

When a plurality of recesses are formed to provide recess rows (in a case in which recesses are circular or elliptical, dot rows), the formation interval between the recess rows in a longitudinal direction of the ribbon (DL) is preferably 2 mm or more, more preferably beyond 2 mm, and further preferably 5 mm or more. The DL is preferably 20 mm or less. When the DL is 2 mm or more, effects of iron loss reduction and productivity improvement are strong, and in a range beyond 2 mm the effect of iron loss reduction exhibits more remarkably. When the DL is 20 mm or less, the reduction effect on an iron loss due to a laser processing is superior and it is advantageous from a viewpoint of productivity improvement. The DL is more preferably in a range of from 5 mm to 10 mm.

With respect to a plurality of recesses, the center-to-center distances of recesses is preferably equal. When the center-to-center distance of recesses is equal, it can be conceived that a magnetic domain is refined by formation of recesses. In this regard, the term "equal" includes not only a case in which the center-to-center distances are exactly the same, but also a case in which there is such little difference among a plurality of center-to-center distances as the distances may be deemed practically same, even if the distances are not exactly the same.

There is no particular restriction on the shape of a recess to be formed on the Fe-based amorphous alloy ribbon, any optional shape, such as a circular, elliptical, square, rectangular, rhombic, and parallelogram shape, may be selected. Among them, a circular or elliptical shape is preferable from a viewpoint of formability by laser irradiation or easiness in formation.

Figure 4:
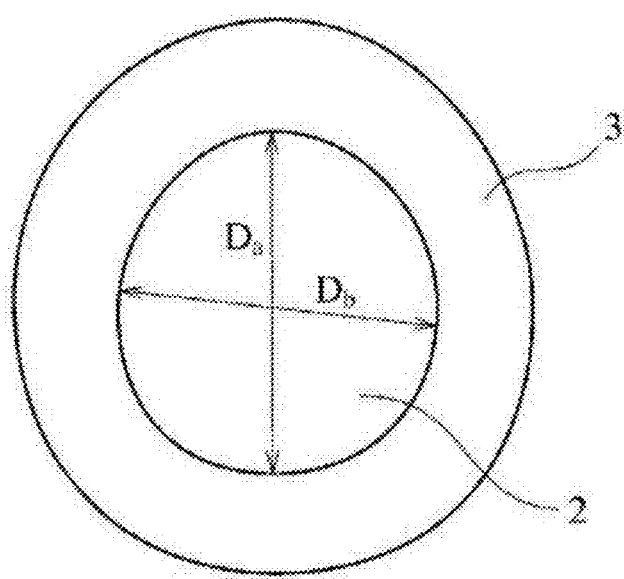
FIG. 4 is a schematic plan view showing schematically a recess formed in an Fe-based amorphous alloy ribbon.

In this regard, in the case of a circular shape, the contour of the recess 2 is not necessarily required to be a perfect circle, and may be a skewed circle or an ellipse as shown in FIG. 4. When a circle or an ellipse is skewed, the skewness, namely the ratio (Da/Db) of a major diameter Da to a minor diameter Db is preferably 1.5 or less.

Figure 3:
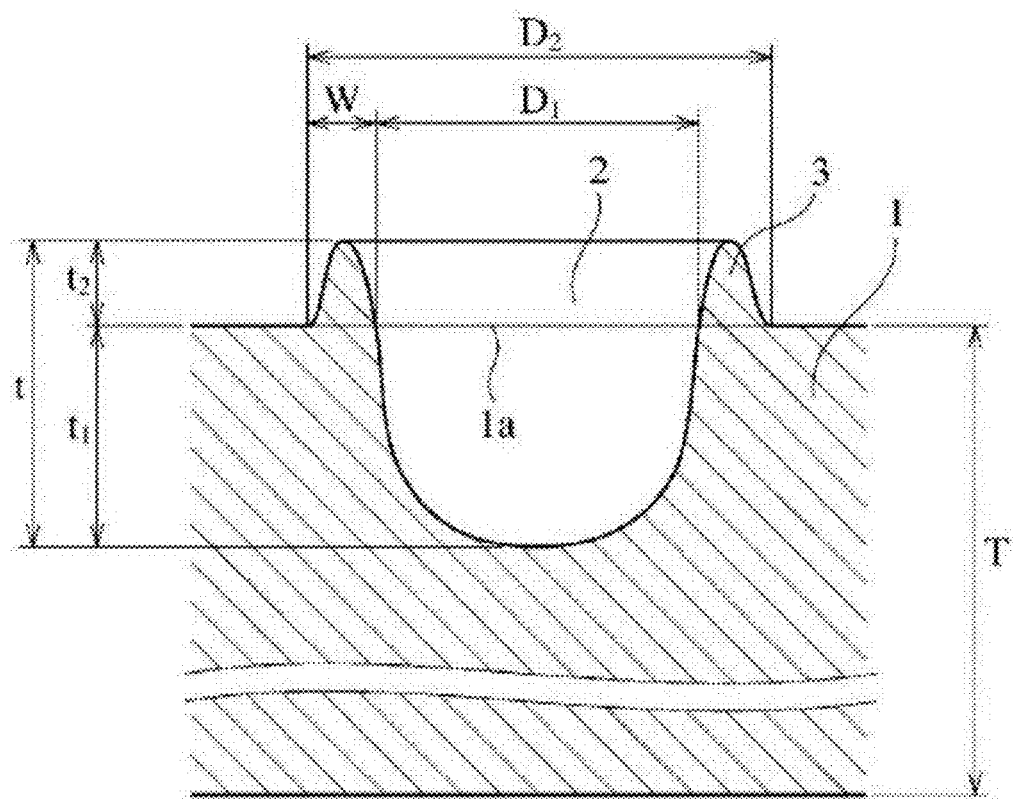
FIG. 3 is a schematic cross-sectional view showing schematically a recess formed in an Fe-based amorphous alloy ribbon.

The shape of a recess is defined as shown in FIG. 3 and FIG. 4. FIG. 3 is a schematic diagram showing schematically a cross-section of a circular recess 2 and a surrounding annular protrusion 3 formed on the Fe-based amorphous alloy ribbon. FIG. 4 is a schematic plan view showing schematically a planar view of the shape of the recess in FIG. 3.

As shown in FIG. 3, the diameter D1 of the recess 2 is a diameter of the opening of the recess 2 at crossing positions with a straight line 1$a$ which coincides with the ribbon surface. The depth t1 of the recess 2 is a distance between the straight line 1$a$ and the bottom of the recess 2. The outer diameter D2 of the annular protrusion 3 is an outer diameter of the annular protrusion at positons crossing the straight line 1$a$. The height t2 of the annular protrusion is a distance between the straight line 1$a$ and the apex of the annular protrusion 3. The width W of the annular protrusion 3 is a width ((D2−D1)/2) of the annular protrusion 3 at positions crossing with the straight line 1$a$. These parameters are expressed by an average value of values to be obtained respectively with respect to a plurality of recesses 2 and annular protrusions 3 in a recess row in a width direction.

The size of a recess to be formed on the Fe-based amorphous alloy ribbon, for example, in the case of a circle or an ellipse, may be in terms of the maximum diameter in a range of from 30 μm to 120 μm, and preferably in a range of from 35 μm to 70 μm. When the size of a recess is not too small and 30 μm or more, it is believed that a magnetic domain is refined by recess formation. Further, when the size of a recess is not too large, and 120 μm or less, it is believed that a local strain introduced by an influence of a laser processing is suppressed to maintain the hysteresis loss low.

The depth of a recess to be formed on the Fe-based amorphous alloy ribbon may be in a range of 1 μm or more, and preferably in a range of 2 μm or more. Meanwhile, the depth of a recess may be in a range of 5 μm or less, and preferably in a range of 4 μm or less. When the depth of a recess is not too shallow and 2 μm or more, it is conceivable that effects of iron loss reduction and magnetic domain refinement are promoted. Further, when the depth of a recess is not too deep, and 4 μm or less, the laser processing can be speedy and a local strain introduced by an influence of a laser processing is suppressed to maintain the hysteresis loss low. By this means, an iron loss can be suppressed low.

A more preferable state at a part where a recess is formed by a laser processing is that there is an annular bulging, but no scattered matter adhered to the surroundings after the Fe-based amorphous alloy is melted or vaporized by laser light.

The reflectance (R) of a ribbon surface of the Fe-based amorphous alloy ribbon at a wavelength (λ) of 1000 nm is preferably in a range of from 50% to 80% from a viewpoint of improvement of a laser irradiation efficiency. In this regard, a reflectance (R) is determined by the following formula:

$$R\ (\%) = 100 \times \varphi r / \varphi$$

wherein φ represents an amount of light flux entering vertically a ribbon surface, φr represents an amount of light flux reflecting from the ribbon surface to the incident direction. In this regard, φ and φr are values measured with a spectrophotometer (JASCO V-570, produced by Jasco Corporation) at a wavelength (λ) of 1000 nm.

—Fe-Based Amorphous Alloy Ribbon—

As an alloy for the Fe-based amorphous alloy ribbon constituting a wound magnetic core according to the invention, an Fe—B system, an Fe—Si—B system, an Fe—Si—B—C system, an Fe—Si—B—P system, an Fe—Si—B—C—P system, an Fe—P—B system, etc. can be applied. Especially, alloys of an Fe—Si—B system, and an Fe—Si—B—C system are preferable, because they become hardly brittle even after laser irradiation, and are agreeable to a processing such as cutting.

As an Fe—Si—B amorphous alloy, an alloy of a system with a composition containing Si of from 2 atom-% to 13 atom-% and B of from 8 atom-% to 16 atom-%, wherein the balance is substantially Fe and incidental impurities, is preferable. As an Fe—Si—B—C amorphous alloy, an alloy of a system with a composition containing Si of from 2 atom-% to 13 atom-%, B of from 8 atom-% to 16 atom-%, and C of 3 atom-% or less, wherein the balance is substantially Fe and incidental impurities, is preferable. In either of the systems, when Si is 10 atom-% or less, and B is 16 atom-% or less, the saturation magnetic flux density Bs is high, the reduction effect on an iron loss due to laser irradiation is high, and production is easy.

Meanwhile, in the case of an Fe—Si—B—C amorphous alloy ribbon, when C is added excessively, the ribbon tends to become brittle. Therefore, the C amount is preferably 0.3 atom-% or less.

The Fe-based amorphous alloy may contain in addition to the above components an element selected from the group consisting of Co, Ni, Mn, Cr, V, Mo, Nb, Ta, Hf, Zr, Ti, Cu, Au, Ag, Sn, Ge, Re, Ru, Zn, In, and Ga, at a total content of 5 atom-% or less with respect to the Fe amount.

A thickness of the Fe-based amorphous alloy ribbon is preferably in a range of 15 μm or more, and more preferably in a range of 20 μm or more. Further, a thickness is preferably in a range of 40 μm or less, more preferably in a range of 35 μm or less, and further preferably in a range of 30 μm or less. When a thickness is 15 μm or more, it is advantageous from a viewpoint that the mechanical strength of a ribbon can be maintained, and further that the space factor can be made high and the number of layers in winding the ribbon to form a wound magnetic core can be decreased. Meanwhile, when a thickness is 40 µm or less, it is advantageous from a viewpoint that the eddy-current loss can be suppressed low, and further that an amorphous phase can be stably formed so as to reduce a bending strain in processing to a wound magnetic core.

The length in a width direction (width) crossing at right angles to a longitudinal direction (casting direction) of the Fe-based amorphous alloy ribbon is preferably from 15 mm to 250 mm. When the width is 15 mm or more, a magnetic core with a large capacity can be easily produced. Meanwhile, when the width is 250 mm or less, an alloy ribbon with a ribbon thickness uniform in a width direction can be easily produced. For producing a practical magnetic core having a large capacity, the width is more preferably from 50 mm to 220 mm.

Production (casting) of the Fe-based amorphous alloy ribbon may be conducted by a publicly known method, for example, a liquid quenching method (such as a single-roll method, a twin-roll method, and a centrifugation method). Among them, a single-roll method is a production method which uses relatively simple production equipment enabling stable production, and exhibits excellent industrial productivity.

An embodiment of a production method by a single-roll method will be described referring to FIG. 6.

Figure 6:
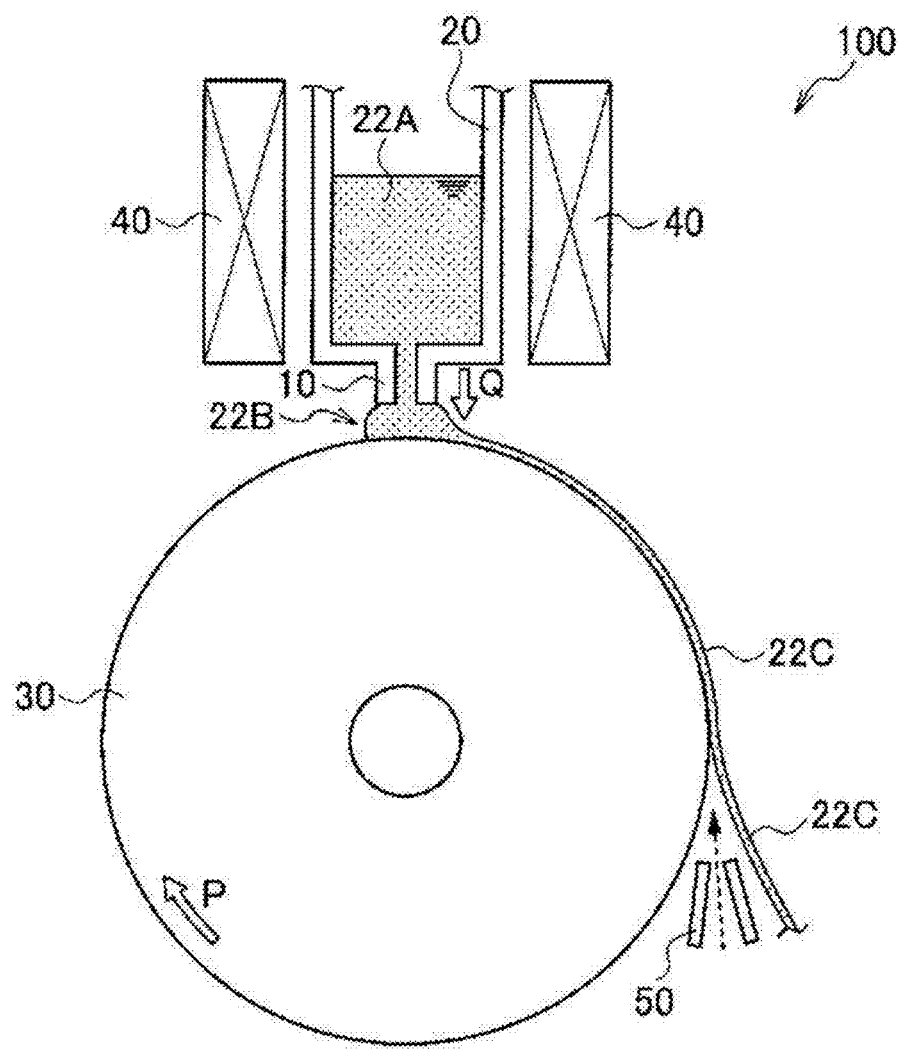
FIG. 6 is a schematic cross-sectional view showing conceptually an embodiment of a production apparatus for producing an Fe-based amorphous alloy ribbon.

FIG. 6 is a schematic cross-sectional view showing conceptually an example of a production apparatus for the Fe-based amorphous alloy ribbon for producing the Fe-based amorphous alloy ribbon. FIG. 6 shows a cross-section of the production apparatus for the Fe-based amorphous alloy ribbon 100 cut along a plane perpendicular to the axis direction of a chill roll 30 and the width direction of the Fe-based amorphous alloy ribbon 22C (the 2 directions are identical).

The production apparatus for the Fe-based amorphous alloy ribbon 100 shown in FIG. 6 is a production apparatus for the Fe-based amorphous alloy ribbon by a single-roll method and provided with a crucible 20 provided with a nozzle 10 and a chill roll 30 whose surface faces a edge of the nozzle 10.

The crucible 20 has an internal space which can accommodate a molten alloy 22A to be used as a source material for the Fe-based amorphous alloy ribbon, and the internal space communicates with a molten metal flow channel in the nozzle 10. By this means, the molten alloy 22A accommodated in the crucible 20 can be discharged through the nozzle 10 to the chill roll 30 (in FIG. 6, the discharge direction and the flow direction of the molten alloy 22A is indicated by an arrow Q). In this regard, the crucible 20 and the nozzle 10 may be constituted as a single body, or constituted as separate bodies.

At at least a part of the circumference of the crucible 20, a high-frequency coil 40 is placed as a heating means. By this, the crucible 20 in a state accommodating a mother alloy for the Fe-based amorphous alloy ribbon can be heated to generate a molten alloy 22A in the crucible 20, or a molten alloy 22A supplied from the outside to the crucible 20 can be kept in a liquid state.

The nozzle 10 has an opening for discharging a molten alloy (discharge slot). The opening has preferably a rectangular aperture shape (slit shape).

The length of the long side of the rectangular opening is a length corresponding to the width of the Fe-based amorphous alloy ribbon to be produced.

The gap between the edge of the nozzle 10 and a surface of the chill roll 30 is so narrow that a puddle 22B of the molten alloy 22A is formed when the molten alloy 22A is discharged through the nozzle 10.

The gap may be in a range ordinarily selected for a single-roll method, and is preferably 500 µm or less, more preferably 300 µm or less, and especially preferably 200 µm or less. The gap is preferably 50 µm or more from a viewpoint of avoidance of a contact of the edge of the nozzle 10 with the surface of the till roll 30.

The chill roll 30 is configured such that it rotates about the axis in the direction of an arrow P. A cooling medium such as water flows though the inside of the chill roll 30. By this means, the molten alloy 22A applied (discharged) to a surface of the chill roll 30 is cooled to produce (cast) the Fe-based amorphous alloy ribbon 22C.

The material of the chill roll 30 is preferably a material with a high thermal conductivity selected from Cu, and Cu alloys (such as a Cu—Be alloy, a Cu—Cr alloy, a Cu—Zr alloy, a Cu—Zn alloy, a Cu—Sn alloy, and a Cu—Ti alloy).

Although there is no particular restriction on the surface roughness of the surface of the chill roll 30, the arithmetic average roughness (Ra) of the surface of the chill roll 30 is preferably 0.5 µm or less, and more preferably 0.3 µm or less from a viewpoint of space factor. The arithmetic average roughness (Ra) of the surface of the chill roll 30 is preferably, from a viewpoint of processability for adjusting the surface roughness, 0.1 µm or more. Further, for the sake of maintenance of a surface roughness (Ra), the surface of the chill roll 30 may be polished, for example, with a brush during production of an alloy ribbon.

The surface roughness (the arithmetic average roughness Ra) refers to a surface roughness according to HS B 0601 (2001).

As the chill roll 30, a chill roll used ordinarily for a single-roll method may be used.

The diameter of the chill roll 30 is preferably 200 mm or more, and more preferably 300 mm or more from a viewpoint of cooling power. The diameter is preferably 700 mm or less.

The rotation speed of the chill roll 30 may be in a range ordinarily selected for a single-roll method. Although a higher circumferential speed is preferable for higher productivity, a circumferential speed of 40 m/s or less is preferable for maintaining a stable rotation of the roll. Considering both the productivity and the rotation stability, a circumferential speed of 10 m/s or more is preferable, and a circumferential speed of 20 m/s or more is more preferable. Further, the upper limit of the circumferential speed is more preferably 35 m/s or less, and further preferably 30 m/s or less.

The temperature of the surface of the chill roll 30 is preferably stable throughout from the initiation of casting, specifically the temperature is preferably 80° C. or more and more preferably 100° C. or more after a lapse of 5 sec or more from the initiation of a supply of a molten alloy to the surface of the chill roll 30. The upper limit is preferably 300° C. or less, and more preferably 250° C. or less.

The cooling rate of a molten alloy by the chill roll 30 is preferably $1\times10^{5}$° C./s or more, and more preferably $1\times10^{6}$° C./s or more for producing stably an alloy ribbon in an amorphous state.

Operations from discharging of a molten alloy to winding of the Fe-based amorphous alloy ribbon (harvesting) are carried out continuously. By this means, a continuous Fe-based amorphous alloy ribbon as long as, for example, 3,000 m or more in a longitudinal direction can be yielded.

In the vicinity of the surface of the chill roll 30 (downstream in the rotational direction of the chill roll 30 of the nozzle 10), a releasing gas nozzle 50 is placed. Using the same, a releasing gas (a high pressure gas, such as a nitrogen gas and a compressed air) is blown in a direction (direction of a dashed line arrow in FIG. 6) opposite to the rotational direction of the chill roll 30 (arrow P), so that the Fe-based amorphous alloy ribbon 22C can be released efficiently from the chill roll 30.

The Fe-based amorphous alloy ribbon is preferably heat-treated in a temperature range of from 300° C. to 400° C. The heat treatment is preferably conducted by applying a magnetic field of 200 A/m or more, more preferably a magnetic field of 400 A/m or more, in the circumferential direction of a magnetic core.

—Winding Process—

In a winding process according to the invention, the Fe-based amorphous alloy ribbon with recesses formed in a recess forming process is wound to produce a magnetic core.

In this process, the ribbon is wound around a predetermined core material under application of a predetermined tensile stress to produce a magnetic core. In this case the tensile stress during winding may be ordinarily in a range of from 2 N to 20 N, and for purpose of effective achievement of the effects of the Invention winding is preferably carried out under a certain stress, and specifically the tensile stress during winding is preferably in a range of from 4 N to 12N.

After a wound magnetic core is formed by winding the Fe-based amorphous alloy ribbon, a heat treatment in a temperature range of from 300° C. to 400° C. is preferably conducted. Further, it is preferable that preferably a magnetic field of 200 A/m or more, more preferably a magnetic field of 400 A/m or more, is applied in the circumferential direction of a magnetic core during the heat treatment.

<Wound Magnetic Core>

A wound magnetic core according to the invention is produced by winding the Fe-based amorphous alloy ribbon, which central part in a width direction of the alloy ribbon undergoes a laser processing, and a central part in a width direction of the Fe-based amorphous alloy ribbon is configured with a recess row composed of a plurality of recesses formed by laser irradiation, wherein a ratio of a length of the central part to a total width is from 0.2 to 0.8.

There is no particular restriction on a production method of a wound magnetic core according to the invention, insofar as the core has a constitution described above, but the core is preferably produced by the afore-described method of producing a wound magnetic core according to the invention.

Figure 7:
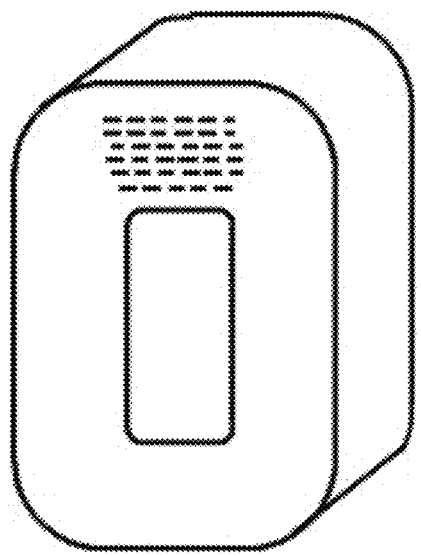
FIG. 7 is a schematic diagram of a magnetic core, which is a rectangular wound magnetic core and has a joint.

The shape of a wound magnetic core according to the invention is not limited to a circle and may be a rectangle as shown in FIG. 7. Further, a wound magnetic core according to the invention may be produced with a plurality of Fe-based amorphous alloy ribbons. Further, a wound magnetic core according to the invention may have an overlap joint or a butt-lap joint.

EXAMPLES

The invention will be described more particularly by way of Examples, provided that the invention be not limited to the following Examples insofar as not departing the spirit thereof.

—Production of Fe-Based Amorphous Alloy Ribbon—

A continuous ribbon of an $Fe_{81.7}Si_2B_{16}C_{0.3}$ alloy (Fe-based amorphous alloy ribbon) with a width of 25 mm, and a thickness of 24 μm was produced by a single-roll method in the air according to the following procedures. The unit for a content is "atom-%".

Measurements of respective elements were carried out, for Si and B by an ICP emission spectroscopic analysis method, and for C by an infrared absorption method after combustion in an oxygen stream, respectively. With respect to Fe, the content was calculated by subtracting the total contents of Si, B and C from 100.

Specifically, a production apparatus for the Fe-based amorphous alloy ribbon constituted similarly to the production apparatus 100 shown in FIG. 6 was prepared, in which a chill roll described below was used.

Firstly, a molten alloy composed of Fe, Si, B, C, and incidental impurities (hereinafter referred to also as "Fe—Si—B—C molten alloy") was prepared in a crucible. More particularly, a mother alloy composed of Fe, Si, B, and incidental impurities was melted, and carbon was added to the obtained molten metal and dissolved by mixing to prepare a molten alloy for producing the Fe-based amorphous alloy ribbon with the above composition. Next, the Fe—Si—B—C molten alloy was discharged through an opening of a nozzle having a rectangular (slit shaped) opening with a long side length of 25 mm and a short side length of 0.6 mm to a surface of a rotating chill roll for rapid solidification to yield 30 kg of an Fe-based amorphous alloy ribbon with a width of 25 mm, and a thickness of 24 μm.

<Production Conditions for Fe-Based Amorphous Alloy Ribbon>

Chill roll: Material: Cu—Be alloy
  Diameter: 400 mm
  Arithmetic average roughness Ra of chill roll surface: 0.3 μm
Discharge pressure of molten alloy: 20 kPa
Circumferential speed of chill roll: 25 m/s
Molten alloy temperature: 1,300° C.
Distance between nozzle edge and chill roll surface: 200 μm Example 1

Recess rows were formed on a free solidification surface of the $Fe_{81.7}Si_2B_{16}C_{0.3}$ alloy ribbon obtained as above in a central part in a width direction of the ribbon by scanning pulsed laser light with a wavelength of 1,065 nm, a pulse width of 550 ns, and a beam diameter of 60 μm from a fiber laser through a galvano scanner (mirror) such that margins in a predetermined distance from both ends in a width direction were not irradiated with the laser light as shown in FIG. 1-A. The then irradiation energy was 0.3 mJ/pulse or 1.26 mJ/pulse. With respect to formation of recess row, by 2 levels of irradiation energy being applied respectively to the $Fe_{81.7}Si_2B_{16}C_{0.3}$ alloy ribbon, total 4 kinds of samples (ribbon sample No. 2 to ribbon sample No. 5) contain samples that a plurality of recesses are formed in a central part excluding margins in a length of 5 mm from both ends in a width direction as shown in FIG. 1-A (ratio of length to total width 1:0.6), and samples as a comparative material that recesses are formed entirely in a width direction as shown in FIG. 1-B were prepared. Further, as a comparative material, a ribbon sample No. 1 not subjected to a laser processing was prepared.

In forming recesses, the interval (number density) between recesses in a recess row in a width direction was 6 pieces/mm, and the interval DL between recess rows in a longitudinal direction of a ribbon was 5 mm. The depth of a recess [μm] and the time required for a laser processing under a specified condition relative to the time required for a laser processing over the entire width of the ribbon at 1.26 mJ/pulse as 100 was as shown in the following Table 1.

Recesses and the surrounding shapes in the case of irradiation energy of 0.3 mJ/pulse are shown in FIG. 5-A, and recesses and the surrounding shapes in the case of irradiation energy of 1.26 mJ/pulse are shown in FIG. 5-B.

TABLE 1

| Ribbon sample No. | Irradiation energy [mJ/pulse] | Area processed with laser | Recess interval | Processing time | Recess depth [μm] | Remarks |
|---|---|---|---|---|---|---|
| 1 | | Without laser processing | | | | Comparative |
| 2 | 0.3 | Entirely in a width direction | 6 pieces/mm | 100 | 2 | Comparative |
| 3 | 0.3 | Central part excluded 5 mm each from both ends in a width direction (ratio of length to total width: 0.6) | 6 pieces/mm | 65 | 2 | Condition within the scope of the invention |
| 4 | 1.26 | Entirely in a width direction | 6 pieces/mm | 100 | 4 | Comparative |
| 5 | 1.26 | Central part excluded 5 mm each from both ends in a width direction (ratio of length to total width: 0.6) | 6 pieces/mm | 65 | 4 | Condition within the scope of the invention |

—Heat Treatment of Fe-based Amorphous Alloy Ribbon—

The thus prepared 5 kinds of ribbon sample No. 1 to ribbon sample No. 5 were cut to a length of 120 mm and heat-treated at 340° C. for 2 hours while applying a direct current magnetic field of 2,400 mA/m in a longitudinal direction of the ribbon.

—Iron Loss of Ribbon—

An iron loss (W/kg) at a frequency of 50 Hz, and a magnetic flux density B of from 1.35 (T) to 1.50 (T) of each ribbon sample ($Fe_{81.7}Si_2B_{16}C_{0.3}$ alloy ribbon) after the heat treatment was measured. The measurement results are shown in the following Table 2.

TABLE 2

| | Ribbon sample No. | | | | |
|---|---|---|---|---|---|
| B (T) | 1 | 2 | 3 | 4 | 5 |
| 1.35 | 0.087 | 0.080 | 0.077 | 0.065 | 0.073 |
| 1.40 | 0.092 | 0.083 | 0.084 | 0.069 | 0.079 |
| 1.45 | 0.098 | 0.092 | 0.090 | 0.075 | 0.085 |
| 1.50 | 0.108 | 0.100 | 0.099 | 0.083 | 0.092 |

As shown in the Table 2, ribbon sample No. 2 to ribbon sample No. 5 which have undergone a laser processing exhibited at each magnetic flux density a lower iron loss, compared to the laser untreated ribbon sample No. 1.

Comparing the ribbon sample No. 2 (0.3 mJ/pulse) and the ribbon sample No. 4 (1.26 mJ/pulse) which were irradiated with laser light entirely in a width direction, the ribbon sample No. 4 for which the irradiation energy was higher exhibited at each magnetic flux density a lower iron loss. Meanwhile, comparing the ribbon sample No. 3 (0.3 mJ/pulse) and the ribbon sample No. 5 (1.26 mJ/pulse) which were irradiated with laser light in a central part excluding 5 mm each from both ends in a width direction (ratio of length to total width: 0.6), the ribbon sample No. 5 for which the irradiation energy was higher exhibited a lower iron loss similarly as above.

When the iron loss is compared at each irradiation energy, by comparing the ribbon sample Nos. 2 and 4, which were irradiated with laser light entirely in a width direction, with the ribbon samples Nos. 3 and 5, which were irradiated with laser light in a central part excluding 5 mm each from both ends in a width direction, as shown in Table 2 in comparison of the ribbon sample No. 2 and the ribbon sample No. 3, the ribbon sample No. 3 which were irradiated with laser light in the central part exhibited on the whole a lower iron loss, but in comparison of the ribbon sample No. 4 and the ribbon sample No. 5, reversely the ribbon sample No. 5 exhibited a higher iron loss. In other words, in a state of a ribbon sample, the advantage of the case of laser irradiation on only a central part over the case of laser irradiation entirely in a width direction cannot be confirmed.

—Production of Wound Magnetic Core and Heat Treatment Thereof—

Next, the 5 kinds of ribbon sample No. 1 to ribbon sample No. 5 shown in the Table 1 were wound respectively around a core material with a predetermined size to produce wound magnetic cores with an inner diameter of 40 mm, and an outer diameter of 45.8 mm. The respective wound magnetic cores were heat-treated at 340° C. for 2 hours while applying a direct current magnetic field of 1,500 A/m in a longitudinal direction of a magnetic path, namely in the circumferential direction of a wound magnetic core.

—Iron Loss of Wound Magnetic Core—

An iron loss was measured by winding a primary winding and a secondary winding around a magnetic core and changing an exciting magnetic flux density in a range of from 1.35 T to 1.50 T at a frequency of 50 Hz. The measurement results are shown in the following Table 3. The sample No. of a wound magnetic core in Table 3 corresponds to the ribbon sample No. in the Table 1 respectively.

TABLE 3

| | Iron loss (50 Hz) [W/kg] | | | | |
|---|---|---|---|---|---|
| | Wound magnetic core No. | | | | |
| | 1 | 2 | 3 | 4 | 5 |
| B (T) | (Comparative) | (Comparative) | (Inventive) | (Comparative) | (Inventive) |
| 1.35 | 0.147 | 0.127 | 0.121 | 0.117 | 0.120 |
| 1.40 | 0.162 | 0.139 | 0.133 | 0.135 | 0.133 |

TABLE 3-continued

| | Iron loss (50 Hz) [W/kg] Wound magnetic core No. | | | | |
|---|---|---|---|---|---|
| B (T) | 1 (Comparative) | 2 (Comparative) | 3 (Inventive) | 4 (Comparative) | 5 (Inventive) |
| 1.45 | 0.177 | 0.157 | 0.149 | 0.161 | 0.152 |
| 1.50 | 0.199 | 0.179 | 0.170 | 0.186 | 0.176 |

The wound magnetic cores Nos. 2 to 5 produced using the ribbon sample No. 2 to ribbon sample No. 5 subjected to a laser processing exhibited at each magnetic flux density a lower iron loss compared to the wound magnetic core 1 using the laser untreated ribbon sample No. 1. Further, at each irradiation energy, iron losses will be compared.

With respect to ribbon samples Nos. 2 and 3 for which the irradiation energy was 0.3 mJ/pulse, the inventive wound magnetic core No. 3 using the ribbon sample No. 3 exhibited a lower iron loss compared to the comparative wound magnetic core No. 2 using the ribbon sample No. 2 at each magnetic flux density.

From the above results, it has become clear that when the Fe-based amorphous alloy ribbon is wound to produce a wound magnetic core, by avoiding a laser processing in the margins in a width direction of the Fe-based amorphous alloy ribbon, namely only a central part is subjected to a laser processing, a lower iron loss is achieved compared to the wound magnetic core No. 1 using a laser untreated alloy ribbon, or the wound magnetic cores Nos. 2 and 4 using an alloy ribbon having undergone a laser processing entirely in a width direction.

Example 2

A recess row was formed in a central part in a width direction of a ribbon, and samples (ribbon sample No. 7 to ribbon sample No. 13), in which a plurality of recesses were formed in a central part excluding predetermined margins from both ends in a width direction as shown in FIG. 1-A (refer to Table 4 with respect to the ratio of length to the total width 1) were produced identically with Example 1 except that the conditions for a laser processing in Example 1 were changed as set forth in the following Table 4. In this case, the irradiation energy was 0.3 mJ/pulse and the interval between recesses (number density) was 6 pieces/mm.

TABLE 4

| Ribbon sample No. | Irradiation energy [mJ/pulse] | Area processed with laser | Processing time (s) | Recess interval in longitudinal direction of ribbon DL (mm) | Recess depth [μm] | Remarks |
|---|---|---|---|---|---|---|
| 6 | | Without laser processing | | | | Comparative |
| 7 | 0.3 | Central part excluded 1 mm each from both ends in a width direction (ratio of length to total width: 0.92) | 95 | 5 | 2 | Comparative |
| 8 | 0.3 | Central part excluded 5 mm each from both ends in a width direction (ratio of length to total width: 0.6) | 65 | 5 | 2 | Condition within the scope of the invention |
| 9 | 0.3 | Central part excluded 7 mm each from both ends in a width direction (ratio of length to total width: 0.44) | 50 | 5 | 2 | Condition within the scope of the invention |
| 10 | 0.3 | Central part excluded 10 mm each from both ends in a width direction (ratio of length to total width: 0.2) | 25 | 5 | 2 | Condition within the scope of the invention |
| 11 | 0.3 | Central part excluded 5 mm each from both ends in a width direction (ratio of length to total width: 0.6) | 160 | 2 | 2 | Condition within the scope of the invention |
| 12 | 0.3 | Central part excluded 5 mm each from both ends in a width direction (ratio of length to total width: 0.6)) | 45 | 7 | 2 | Condition within the scope of the invention |
| 13 | 0.3 | Central part excluded 5 mm each from both ends in a width direction (ratio of length to total width: 0.6) | 35 | 10 | 2 | Condition within the scope of the invention |

With respect to ribbon samples Nos. 4 and 5 for which the irradiation energy was 1.26 mJ/pulse, the inventive wound magnetic core No. 5 using the ribbon sample No. 5 exhibited an equal to or lower iron loss compared to the comparative wound magnetic core No. 4 using the ribbon sample No. 4 at each magnetic flux density.

Specifically, for example, at B=1.50 (T) the inventive wound magnetic core No. 5 using the ribbon sample No. 5 exhibited, compared to the comparative wound magnetic core No. 4 using the ribbon sample No. 4; and the inventive wound magnetic core No. 3 using the ribbon sample No. 3 exhibited, compared to the wound magnetic core No. 2 using the ribbon sample No. 2, an iron loss lower by 0.01 W/kg.

In this regard, with respect to the iron loss difference of 0.01 W/kg, since this value of 0.01 W/kg is related to an iron loss of 0.14 W/kg, and means that the iron loss is reduced by 7% to 8%, and the reduction effect is significant.

—Production of Wound Magnetic Core and Heat Treatment Thereof—

Next wound magnetic cores were produced with the ribbon sample No. 6 to ribbon sample No. 13 shown in the Table 4 similarly as in Example 1 and heat-treated. With respect to the heat treatment, conditions, such as a temperature, and application of a direct current magnetic field, were the same, however a different heat treatment oven was used.

—Iron Loss of Wound Magnetic Core—

An iron loss was measured by winding a primary winding and a secondary winding around a magnetic core and changing an exciting magnetic flux density in a range of from 1.35 (T) to 1.50 (T) at a frequency of 50 Hz. The measurement results are shown in the following Table 5. The sample No. of a wound magnetic core in Table 5 corresponds to the ribbon sample No. in the Table 4 respectively.

TABLE 5

| | Iron loss (50 Hz) [W/kg] Wound magnetic core No. | | | | | | | |
|---|---|---|---|---|---|---|---|---|
| B (T) | 6 (Comparative) | 7 (Comparative) | 8 (Inventive) | 9 (Inventive) | 10 (Inventive) | 11 (Inventive) | 12 (Inventive) | 13 (Inventive) |
| 1.35 | 0.165 | 0.169 | 0.141 | 0.148 | 0.151 | 0.155 | 0.142 | 0.144 |
| 1.40 | 0.177 | 0.180 | 0.156 | 0.158 | 0.164 | 0.172 | 0.154 | 0.158 |
| 1.45 | 0.190 | 0.193 | 0.177 | 0.172 | 0.179 | 0.195 | 0.168 | 0.175 |
| 1.50 | 0.208 | 0.214 | 0.192 | 0.192 | 0.192 | 0.215 | 0.192 | 0.201 |

The wound magnetic cores Nos. 8 to 10 produced using the ribbon samples Nos. 8 to 10, which were irradiated with laser light in a central part excluding 5 mm, 7 mm, and 10 mm respectively from both ends in a width direction (ratio of length to total width: 0.6, 0.44, and 0.2 respectively) exhibited at each magnetic flux density a lower iron loss compared to the wound magnetic core No. 6 using the laser untreated ribbon sample No. 6. Further, the wound magnetic cores Nos. 8 to 10 exhibited at each magnetic flux density a lower iron loss compared to the wound magnetic core No. 7 using the ribbon sample No. 7 which was irradiated with laser light in a central part excluding 1 mm from both ends in a width direction (ratio of length to total width: 0.92).

From the above results, it has become clear that when the Fe-based amorphous alloy ribbon is wound to produce a wound magnetic core, by avoiding a laser processing in the margins in a width direction of the Fe-based amorphous alloy ribbon, namely only a central part excluding predetermined margins from both ends in a width direction (ratio of length to total width: 0.6, 0.44, and 0.2 respectively) is subjected to a laser processing, a lower iron loss is achieved compared to the wound magnetic core No. 6 using a laser untreated alloy ribbon, or the wound magnetic core No. 7 having undergone a laser processing almost entirely in a width direction of the alloy ribbon (ratio of length to total width: 0.92).

In this regard, with respect to the iron loss of a laser untreated wound magnetic core, when the sample No. 1 described in Table 1 and Table 3 is compared with the sample No. 6 described in Table 4 and Table 5, the iron loss of No. 6 is larger than that of No. 1. This was presumably caused by the difference in a heat treatment oven.

Comparing the wound magnetic cores Nos. 8, 11, 12, and 13 using the alloy ribbons Nos. 8, 11, 12, and 13 irradiated with laser light at various intervals DL (mm) of recess formation in a longitudinal direction of a ribbon (DL is 5 mm, 2 mm, 7 mm, or 10 mm respectively) with the wound magnetic core No. 6 using a laser untreated alloy ribbon, or the wound magnetic core No. 7 using the alloy ribbon 7 having undergone a laser processing almost entirely in a width direction (ratio of length to total width: 0.92), substantially all of the wound magnetic cores Nos. 8, 11, 12, and 13 exhibited at each magnetic flux density a lower iron loss compared to the wound magnetic core No. 6. Meanwhile in the case of the wound magnetic core No. 11 in which DL is 2 mm, losses at B=1.45 T and 1.50 T are nearly equal to that of the wound magnetic core No. 7, which indicates that when DL in a longitudinal direction of a ribbon is 2 mm or less, a reduction effect of an iron loss on a wound magnetic core by a laser processing is impaired. From the above results, it is clear that the interval DL of recess formation in a longitudinal direction of a ribbon is preferably 2 mm or more.

INDUSTRIAL APPLICABILITY

The invention is suitable for the field of a power distribution transformer, a high-frequency transformer, a saturable reactor, a magnetic switch, etc.

The entire disclosure of Japanese Patent Applications No. 2013-051035 are incorporated herein by reference.

All the Document, patent Document, and technical standards cited herein are also herein incorporated to the same extent as provided for specifically and severally with respect to an individual Document, patent Document, and technical standard to the effect that the same should be so incorporated by reference.

The invention claimed is:

1. A wound magnetic core which is configured by winding an Fe-based amorphous alloy ribbon, the wound magnetic core comprising a recess row including a plurality of recesses formed by laser irradiation in a central part of the Fe-based amorphous alloy ribbon excluding 5 mm each from both ends in a width direction, wherein the Fe-based amorphous alloy is a FeSiBC alloy with a composition containing Si of from 2 atom-% to 13 atom-%, B of from 8 atom-% to 16 atom-%, C of 3 atom-% or less, and the balance being substantially Fe and incidental impurities, a ratio of a length of the central part to a total width is from 0.2 to 0.8, a depth of each recess is in a range of from 2 μm to 4 μm, and a total width of the Fe-based amorphous alloy ribbon is from 15 mm to 250 mm, and wherein an interval between the recess rows in a longitudinal direction of the alloy ribbon is from 2 mm to 20 mm, a thickness of the Fe-based amorphous alloy ribbon is from 15 μm to 40 μm, and a formation interval of the recesses is in a range of from 4 pieces/mm to 8 pieces/mm in the width direction.

2. The wound magnetic core according to claim 1, wherein a planar view shape of the recesses is a circular or elliptical shape.

3. A method of producing a wound magnetic core according to claim 1, the method comprising:
  forming recesses by irradiating a central part of an Fe-based amorphous alloy ribbon excluding 5 mm each from both ends in a width direction with pulsed laser light to form recesses, wherein a ratio of a length of the central part to a total width is from 0.2 to 0.8, and a total width of the Fe-based amorphous alloy ribbon is from 15 mm to 250 mm, and
  winding the Fe-based amorphous alloy ribbon with the formed recesses to form a magnetic core.

4. The wound magnetic core according to claim 3, wherein in the forming of the recesses the alloy ribbon is irradiated with pulsed laser light at intervals of from 2 mm to 20 mm in a longitudinal direction of the alloy ribbon to form the recesses.

5. The method of producing a wound magnetic core according to claim 3 or claim 4, wherein a thickness of the Fe-based amorphous alloy ribbon is from 15 82 m to 40 µm.

\* \* \* \* \*